UNITED STATES PATENT OFFICE.

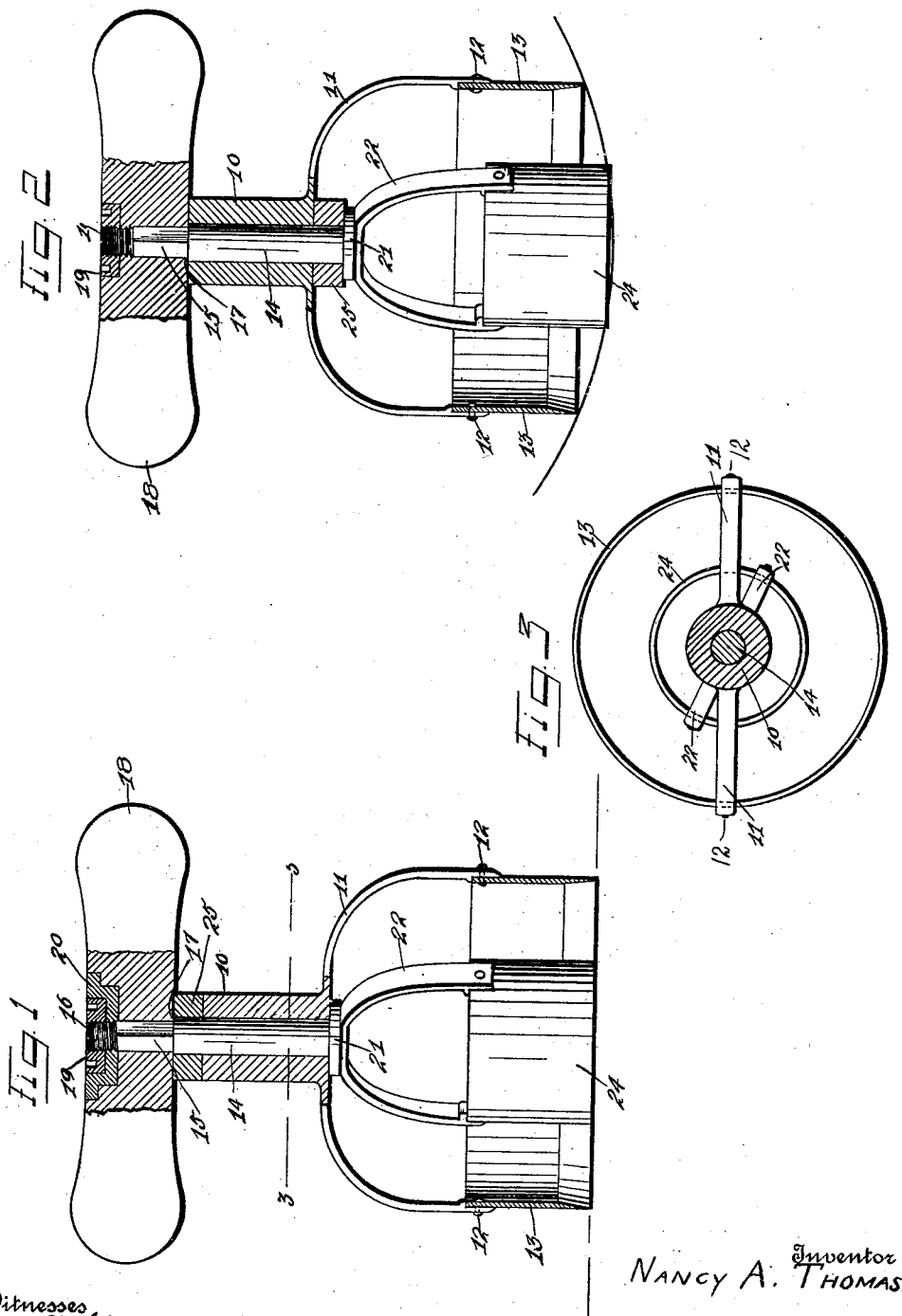

NANCY A. THOMAS, OF MEYERS FALLS, WASHINGTON.

FOOD-CHOPPER.

978,790.           Specification of Letters Patent.     Patented Dec. 13, 1910.

Application filed January 4, 1910. Serial No. 536,394.

*To all whom it may concern:*

Be it known that I, NANCY A. THOMAS, a citizen of the United States, residing at Meyers Falls, in the county of Stevens, State of Washington, have invented certain new and useful Improvements in Food-Choppers; and I do hereby declare the following to be a full, clear, and exact description of the invention, such as will enable others skilled in the art to which it appertains to make and use the same.

This invention relates to household implements, and has for one of its objects to provide a simply constructed device which may be employed as a food chopper, or as a biscuit cutter, or cruller cutter, and for like purposes.

Another object of the invention is to provide a simply constructed device of this character which may be adjusted for use upon a level surface or upon a concaved surface, as may be required.

Another object of the invention is to provide a simply constructed device in which the parts may be readily separated for cleansing, repairs, or renewal.

With these and other objects in view, the invention consists in certain novel features of construction as hereinafter shown and described and then specifically pointed out in the claim; and, in the drawings illustrative of the preferred embodiment of the invention, Figure 1 is a sectional elevation of the improved device as a food chopper for use upon a level surface, Fig. 2 is a sectional elevation of the improved device arranged for use upon a concaved surface, Fig. 3 is a section on the line 3—3 of Fig. 1.

The improved device comprises a stock or main sleeve 10 having a plurality of radially arranged and downwardly curving arms 11. Connected by rivets or other suitable fastening means 12 to the lower ends of the arms 11 is an outer cutting blade 13, and preferably circular.

Fitting through the sleeve 10 is a stem 14 having a reduced upper end 15 with the terminal of the reduced portion threaded as shown at 16, the reduced portion 15 being square or of other form than round, as shown. The reduced portion 15 produces a lateral shoulder 17, and bearing over the reduced portion 15 and supported upon the shoulder 17 is a handle 18 and secured in position by a clamp nut 19, preferably located within a cavity in the handle so that no portion of the nut projects above the general surface of the handle.

The handle may be constructed of wood as shown in Fig. 1, and when thus constructed the cavity for the nut 19 will be provided with a metal bushing 20 to prevent the wear of the wood of the handle. If the handle is formed of metal, as indicated in Fig. 2, the bushing will not be required.

At its lower end the stem 14 is formed with a lateral shoulder 21, and radiating from this shoulder portion are a plurality of arms 22 curving outwardly and downwardly, and connected by rivets or other suitable fastening means to the lower ends of the arms 22 is an inner cutting blade 24, preferably circular, and concentric to the blade 13.

A spacing washer 25 forms a part of the improved device and is adapted to be located around the stem 14 either above or below the sleeve 10. If the spacer member is located above the stem 10, or between the stem and the handle 18, the shoulder 21 will bear directly against the lower end of the stem 10, and thus dispose the cutting edges of the members 13—24 in transverse alinement, as shown in Fig. 1. If on the other hand, the spacer member 25 be located between the sleeve 10 and the shoulder 21 as shown in Fig. 2, the outer cutting member 13 will be located above the inner cutting member 24. By this arrangement if the improved device is to be employed upon a level surface the cutting blades will be arranged as shown in Fig. 1, but if the improved device is to be employed upon a concaved surface, as for instance in a chopping bowl, the cutting blades will be arranged as shown in Fig. 2, and by providing a plurality of the washers 25 of varying thicknesses the difference between the cutting edges of the members 13—24 may be controlled to any desired extent, as will be obvious.

The blades 13—24 may be of any required form or size, and it is not desired therefore to limit the invention to any manner so far as these parts of the device are concerned. By detaching the handle 18 and removing the sleeve 10 and its arm 11 and cutting member 13 and returning the handle to the stem 14—15, the implement forms an efficient biscuit cutter or cruller cutter, or like implement.

The improved device is simple in construction, can be inexpensively manufactured and forms an efficient and useful culinary implement.

What is claimed is:—

An implement of the class described comprising a sleeve having an outer cutting blade connected thereto, a stem fitting through said sleeve and having an inner cutting blade connected thereto, a handle detachably connected to said stem, and a spacer member carried by said stem.

In testimony whereof, I affix my signature, in presence of two witnesses.

NANCY A. THOMAS.

Witnesses:
F. BELLE THOMAS,
RUTH SPENCER.